United States Patent [19]

Boehm

[11] Patent Number: 4,729,289
[45] Date of Patent: Mar. 8, 1988

[54] POWER BRAKE BOOSTER FOR AN AUTOMOTIVE VEHICLE

[75] Inventor: Peter Boehm, Frankfurt am Main, Fed. Rep. of Germany

[73] Assignee: ITT Industries, Inc., New York, N.Y.

[21] Appl. No.: 906,563

[22] Filed: Sep. 8, 1986

Related U.S. Application Data

[63] Continuation of Ser. No. 575,512, Jan. 31, 1984, abandoned.

[30] Foreign Application Priority Data

Feb. 3, 1983 [DE] Fed. Rep. of Germany ....... 3303577

[51] Int. Cl.$^4$ .............................................. F15B 9/10
[52] U.S. Cl. .................................... 91/376 R; 91/534; 92/48
[58] Field of Search ............................. 60/547.1, 581; 91/369 A, 376 R, 534; 92/48

[56] References Cited

U.S. PATENT DOCUMENTS

| | | | |
|---|---|---|---|
| 2,672,015 | 3/1954 | Adams | 92/48 |
| 3,420,145 | 1/1969 | Stumpe | 92/48 |
| 3,478,519 | 11/1969 | Eggstein | 92/48 |
| 3,517,588 | 6/1970 | Kytta | 92/48 |
| 3,603,208 | 9/1971 | Kytta | 92/48 |
| 3,613,506 | 10/1971 | Kytta | 92/48 |
| 4,309,935 | 1/1982 | Belart | 92/48 |
| 4,512,237 | 4/1985 | Endoh | 91/376 R |

FOREIGN PATENT DOCUMENTS

| | | | |
|---|---|---|---|
| 1927945 | 12/1969 | Fed. Rep. of Germany | 92/48 |
| 2051722 | 4/1971 | France. | |
| 1048182 | 11/1966 | United Kingdom. | |
| 1157861 | 7/1969 | United Kingdom. | |
| 1221452 | 2/1971 | United Kingdom. | |
| 2074268 | 10/1981 | United Kingdom. | |

Primary Examiner—Abraham Hershkovitz
Attorney, Agent, or Firm—James B. Raden; Robert P. Seitter

[57] ABSTRACT

In a power brake booster for an automotive vehicle, with a housing (1, 2) subdivided into two compartments by a partition wall (41), the compartment close to the brake pedal contains a working chamber (25) and a vacuum chamber (33), while the compartment close to the master cylinder contains a working chamber (24) and a vacuum chamber (32), with a longitudinally slidable control housing (4) with valve device (8, 37, 38) being sealably held and guided in a central opening of the partition wall (41), the said control housing incorporating a longitudinal channel, for instance on annular gap (21) which, on the one hand, is via an opening or bore (26) in communication with the one working chamber (24), while, on the other hand, it terminates into a chamber, for example an annular chamber (20), which is connected to the valve chamber (42) behind the valve device (8, 37, 38) and which is connected to the other working chamber (25) via a cross bore (39). Through the valve device (8, 37, 38), the annular gap (21) is connected to another channel (34) which is provided in the control housing (4) and is in permanent communication with the suction port (11) so that both working chambers (24, 25) are connected both to the vacuum source and to the outside air through channels (34, 36 and 20, 19, 21, 26, 39, respectively) provided in the control housing (4).

3 Claims, 1 Drawing Figure

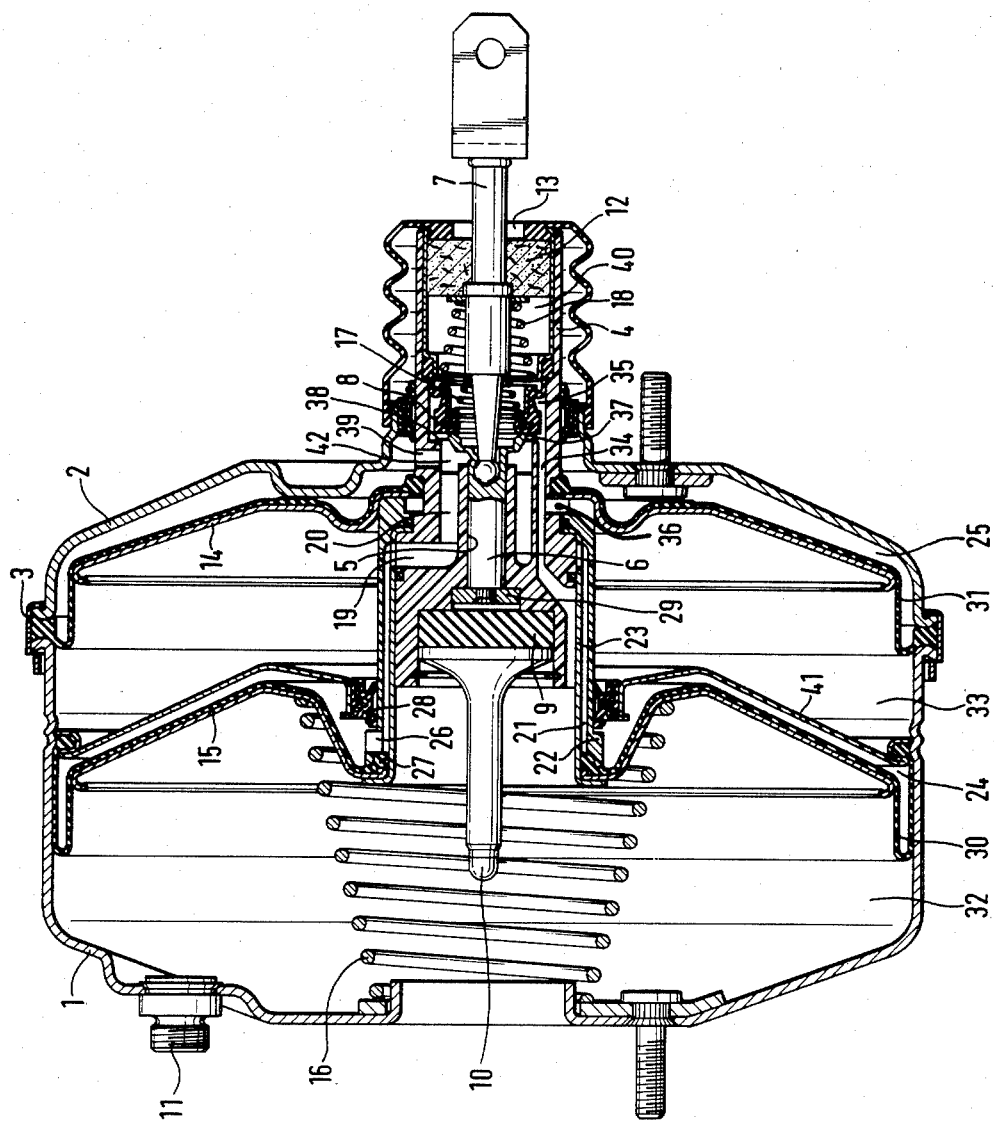

POWER BRAKE BOOSTER FOR AN AUTOMOTIVE VEHICLE this application is a continuation of application ser. No. 575,512 filed 1-31-84 now abandoned.

BACKGROUND OF THE INVENTION

The present invention relates to a power brake booster for an automotive vehicle, with a housing subdivided into two compartments by a partition wall, the said compartments comprising each in a booster close to the brake pedal and in a booster close to the master cylinder one vacuum chamber of constant pressure and one working chamber of variable pressure, wherein a control housing slidable in the actuating direction accommodates a valve device which cooperates with the piston rod of the brake pedal and governs the introduction of atmospheric air into the working chambers, a push rod being operatively connected with the control housing and displacing the piston of the master cylinder.

In a known power brake booster (FR-PS No. 1,537,497), the connection of the two vacuum chambers is effected such that the housing of the power brake booster is of larger diameter on the master cylinder side than it is on the brake pedal side. Inserted into the portion of larger diameter is a cylindrical bowl whose bottom constitutes the partition wall of the power brake booster. An annular chamber is formed between the inserted cylindrical bowl and the larger-diameter housing portion of the power brake booster through which chamber the vacuum is allowed to propagate from one vacuum chamber to the other.

It is the disadvantage of the priorly known power brake booster that it is of relatively complicated design. It is above all disadvantageous in respect of costs that the cylindrical bowl has to be held by spacer elements within the housing of the power brake booster. Mounting of such a cylindrical bowl necessitates considerable effort that makes the power brake booster more expensive. The outer diameter of the power brake booster is increased as well as the number of components.

Further, a power brake booster of the type at issue is known (German printed and published patent application No. 29 18 915), wherein the booster piston close to the master cylinder is sealingly connected with the partition wall by a rolling diaphragm, wherein channels extend in a longitudinal direction between the housing and the rolling diaphragm to interconnect the two vacuum chambers, and wherein the rolling diaphragm is equipped with axially extending webs on its side rolling off on the outer wall of the housing.

Likewise this priorly known power brake booster bears the disadvantage of being comparatively expensive in its manufacture, in particular the assembly of the diaphragm furnished with several webs entails intricate work.

It is an object of the present invention to arrange for a power brake booster for an automotive vehicle which avoids the shortcomings of the prior art and which, in addition, enables a maximum possible effective diameter of the booster pistons, their outer diameter being predetermined. Finally, the inventive power brake booster employs a type of construction which saves as much weight as possible, in particular owing to the housing shells' design.

SUMMARY OF THE INVENTION

This object will be achieved by the present invention in that the control housing incorporates a channel, for instance an annular gap, which is, on the one hand, via an opening or bore in communication with the one working chamber, while it terminates, on the other hand, into a chamber, for instance an annular chamber, which is connected with the valve chamber behind the valve device, the said valve chamber being in turn connected via a channel, for instance a cross bore, to the working chamber close to the pedal; the control housing accommodating, in addition, a second channel which connects the vacuum chamber close to the master cylinder with the vacuum chamber close to the brake pedal and with the chamber, for instance the annular channel, the said latter chamber enclosing the valve member, for instance the poppet valve, and being connectible to the valve chamber that is close to the master cylinder via the valve opening which is formed by the poppet valve and the annular seat at the control housing. Preferably, a guiding tube is slid on the end of the control housing close to the brake pedal and is fixed on the control housing with its end close to the brake pedal, the said guiding tube forming an annular gap in conjunction with the outer peripheral surface of the control housing and/or with a sleeve of smaller diameter that is secured to the control housing concentrically relative to the guiding tube, with the end of the sleeve close to the master cylinder being connected with the end of the guiding tube close to the master cylinder through an annular element, for instance the rolling diaphragm bead, the said annular gap communicating, on the one hand, via a radial bore with the working chamber close to the master cylinder, while it is, on the other hand, connected via a channel to the valve chamber.

Favorably, the guiding tube connected to the control housing is longitudinally slidably and sealedly held and guided in a central opening of the partition wall, the end of the guiding tube close to the master cylinder being rigidly connected with the working piston close to the master cylinder in an expedient manner.

To obviate the need for special greasing of the guiding tube and to provide an inexpensive and light component, the guiding tube confining the annular gap outwardly is made from a non-metallic material, for instance any plastic.

The present invention permits various embodiments. One thereof is illustrated in the accompanying drawing which shows the longitudinal cross-section through a power brake booster comprising a housing subdivided into two compartments by a partition wall, with each one vacuum chamber and one working chamber being provided in the compartment close to the brake pedal and in the compartment close to the master cylinder.

BRIEF DESCRIPTION OF THE DRAWING

The single drawing figure illustrates a power brake booster in accordance with the principles of the present invention.

DETAILED DESCRIPTION

The power brake booster illustrated is composed of two shell-shaped housing parts 1, 2 which are held together by means of a clamping ring 3, the housing part 2 close to the brake pedal retaining a control housing 4 in whose central bore 5 a valve piston 6 is supported which is longitudinally displaceable by the piston rod 7 movable by the brake pedal (not shown) and whose end close to the housing is rigidly connected to a pressure member 29, via which the valve piston 6 acts on a reaction disc 9 which, in turn, displaces the push rod 10. The control housing 4 is provided with an annular chamber 20 which communicates via the cross channel 19 with the annular gap 21 which latter is formed by the guiding tube 22 and a sleeve 23, the said guiding tube 22 and said sleeve 23 being slid onto the peripheral surface of the control housing 4. The ends of the guiding tube 22 and of the sleeve 23 which are close to the housing are sealed relative to one another by means of the rolling diaphragm bead 27 of the rolling diaphragm 30 that abuts on the working piston, so that the annular gap 21 formed by the guiding tube 22 and the sleeve 23 is sealed relative to the vacuum chambers 32 and 33, while there is established connection between the working chamber 24 and the annular gap 21 via the bore 26 in the guiding tube 22. The control housing 4 contains a channel 34 which extends in a longitudinal direction and which connects the vacuum chamber 32 to the annular channel 35, on the one hand, and to the vacuum chamber 33 via the cross bore 36, on the other hand. At its end close to the brake pedal, the valve piston 6 is furnished with an annular valve seat 37 which cooperates with the poppet valve 8 made from any elastic material, the said valve being assisted by the valve spring 17 to bear against the valve seat 37 of the valve piston 6 or against the annular seat 38 of the control housing 4, in dependence upon the position of the valve piston 6. The annular chamber 20 in the control housing 4 is not only connected to the working chamber 24 via the cross channel 19 and the annular gap 21, but communicates likewise with the working chamber 25 via the cross bore 39. Reference numeral 11 designates the suction port at the housing part 1 through which the vacuum chamber 32 is connected to the intake tube of the automotive vehicle engine.

The operation of the power brake booster is as follows:

In the released position, the valve piston 6 and the piston rod 7 are retained by the compression spring 18 and the valve spring 17 with respect to the (in the drawing) right-hand end position in the control housing 4, as a result whereof the atmospheric port 12, 13 is closed and the channel 34 in the control housing 4 is opened for the vacuum passage. With the engine running, the air available on the left side of the two working pistons 14, 15 is sucked out through a vacuum check valve (not illustrated) inserted in the vacuum hose connected at 11, since the two vacuum chambers 32, 33 are interconnected via the channel 34 and the cross bore 36. However, in the release position, there is likewise established a connection between the channel 34 and the annular channel 35, respectively, and the annular chamber 20 so that the air is sucked out of the working chambers 24, 25 on the right side of the corresponding working pistons 14, 15, too, until pressure balance is achieved on either side of each of the working pistons 14, 15 as a result. In this stage, the working piston 15 is retained in its right-hand end position by the piston return spring 16. Though atmospheric air is admitted to enter the chamber 40 around the piston rod 7, it is prevented from obtaining access to the working chambers 24, 25 through the atmospheric port closed by the poppet valve 8. In the release position, also the piston in the hydraulic master cylinder (not illustrated in the drawing), acting upon which piston is the push rod 10, is maintained in its initial position by a compression spring.

When the brake pedal is depressed, the piston rod 7 with the valve piston 6 will be displaced leftwards in opposition to the force of the springs 17, 18. In doing so, the valve spring 17 of the poppet valve 8 will urge the said value leftwards onto the annular seat 38 of the control, housing 4, and the passage from the channel 34 and from the annular channel 35, respectively, to the annular chamber 20 will thereby be closed. In the further course of motion, the valve piston 6 moves away from the poppet valve 8, and the atmospheric port 12, 13 will thereby be opened. Now the atmospheric air is allowed to propagate through the annular chamber 20 in the control housing 4 to the right side of the two working pistons 14, 15, as a result whereof the vacuum which previously prevailed here will be discharged. The force which is generated on account of the pressure difference prevailing now between the right and the left sides of the working pistons 14, 15 displaces said pistons leftwards in opposition to the force of the piston return spring 16 and displaces likewise the push rod 10 and the piston in the master cylinder (not shown). The reaction force which is now exerted on the reaction disc 9 will be transmitted onto the valve piston 6, causing the said control housing 4 to displace rightwards and to move with its valve seat 37 into sealing abutment on the poppet valve 8. Thereby, the vacuum passage from the channel 34 to the annular chamber 20 and, simultaneously, the atmospheric port from the chamber 40 to the annular chamber 20, will be closed. The valve piston 6 has thus assumed the ready position.

When the brake is in its full applied position, there will be effected permanent opening of the atmospheric port, resulting wherefrom is the maximally attainable pressure difference at the two working pistons 14, 15 and consequently the maximum boosting pressure. The maximum effect of the power brake booster described will be achieved thereby. When the brake pedal is released completely, the valve piston 6 will return to its initial position, the vacuum passage being opened permanently. In consequence of the vacuum balance at the two working pistons 14, 15 resulting inevitably therefrom, no more force will be exerted on said pistons, and the restoring force of the piston return spring 16 suffices to restore them into their release position, the piston of the master cylinder being likewise caused thereby to return to its release position.

It is an essential advantage of the power brake booster described that all gaps and channels 34, 35, 39, 20, 19, 21, 26 which are required for the control of the vacuum passage from the vacuum chamber 32 to the two working chambers 24, 25 are incorporated within the control housing 4 with its guide tube 22, rigidly fixed to the control housing 4, and within its sleeve 23, for which reason the effective diameter of the working pistons 14, 15 may be increased in the area of the diaphragm seals in comparison with power brake boosters with conventional vacuum passages.

What is claimed is:

1. A power brake booster for an automotive vehicle, said brake booster comprising:
    a housing subdivided into two compartments by a partition wall, said compartments forming boosters and each compartment including one vacuum chamber and one working chamber;

a guiding tube slideably and sealingly guided in a central opening of the partition wall, and a control housing, concentrically located within said guiding tube, one end of said control housing being fixed to one end of said guiding tube and the other end thereof being coupled with the other end of said guiding tube by a rolling diaphragm bead whereby said guiding tube and said control housing are slideable in the housing in an actuating direction, the inner peripheral surface of said guiding tube being spaced from the outer peripheral surface of said control housing to provide an annular gap therebetween;

said one end of said control housing accommodating a poppet of a single booster control valve means, said poppet being operatively associated with a piston rod for operation by a brake pedal to govern the introduction of atmospheric air into both said working chambers; said other end of said control housing being operatively associated with a push rod for displacing a piston of a master cylinder, a piston between said piston rod and said push rod, said piston being fixed to said piston rod;

said annular gap communicating with the working chamber adjacent said other end of said control housing by a radial bore formed adjacent said rolling diaphragm bead, said annular gap terminating adjacent said one end of said control housing and said annular valve chamber being connected by a cross bore to the working chamber adjacent said one end of said control housing and said guiding tube;

said control housing being formed with an annular channel which connects said vacuum chambers with each other and which also connects said vacuum chambers with an annular chamber enclosing said poppet, said annular channel terminating adjacent said valve chamber and being connectible thereto by the opening of said poppet; and said single booster control valve means including a first valve seating surface and a second valve seating surface both cooperating with said poppet for providing a vacuum connection for each said vacuum chamber and each said working chamber when said booster is unactuated and for disconnecting each said vacuum chamber from each said working chamber when said booster is partially actuated and for providing vacuum connections for said vacuum chambers and atmospheric connections for said working chambers when said booster is fully actuated.

2. A power brake booster as recited in claim 1 wherein said working chambers include working pistons on which atmospheric air acts when said booster is fully actuated and wherein said other end of said guiding tube and said control housing are fixed to the working piston of the working chamber adjacent said other end of said guiding tube and said control housing.

3. A power brake booster as recited in claim 1 wherein the guiding tube is made of a non-metallic material.

* * * * *